June 8, 1943.     R. D. BENNETT     2,321,000
FEED CONTROL AND DECELERATION VALVE
Filed Oct. 9, 1941
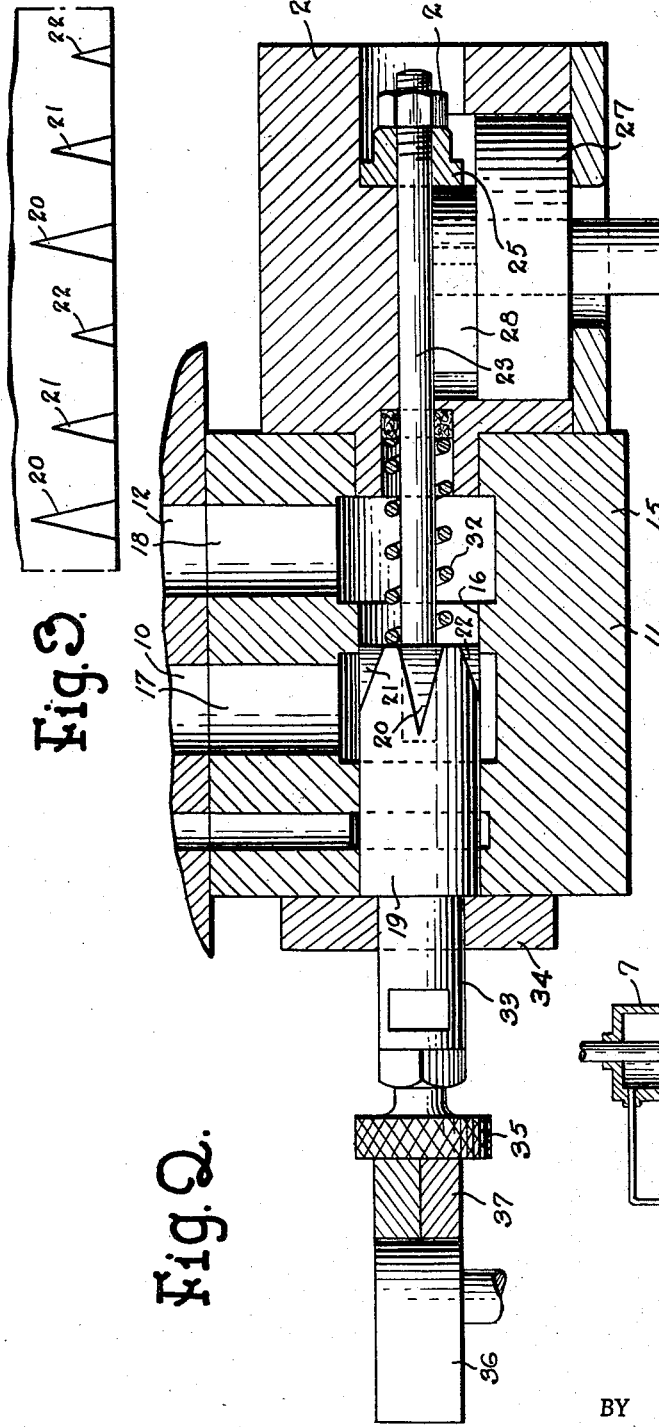
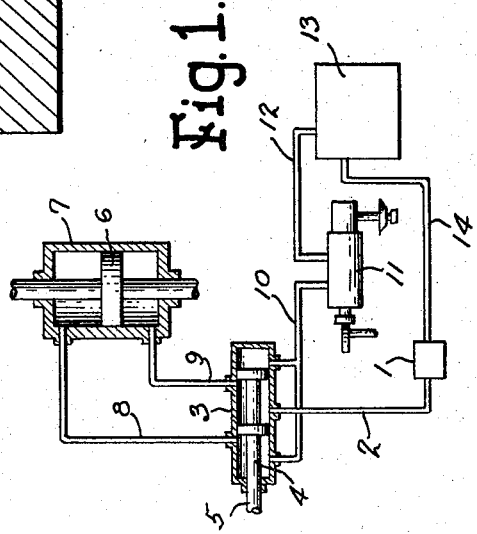
INVENTOR.
Racy D. Bennett
BY
Windsor Davis
Attorney Patented June 8, 1943

2,321,000

UNITED STATES PATENT OFFICE 2,321,000

FEED CONTROL AND DECELERATION VALVE

Racy D. Bennett, Detroit, Mich., assignor to Vinco Corporation, Detroit, Mich., a corporation of Michigan Application October 9, 1941, Serial No. 414,368

3 Claims. (Cl. 251—34)

This invention relates to a fluid control means, and has for its object to provide a fluid control or metering valve in combination with means to employ the valve also as a decelerating valve.

It is customary in devices of the type herein contemplated to provide a metering valve regulated by metering the liquid on the pressure side thereof and to provide a separate decelerating valve which cannot function when the metering valve functions. The disadvantages of such controls are that, when the metering valve is controlled at its side pressure leaks past the hydraulic piston are not taken into account, and that deceleration is controllable only at the ends of the stroke.

The principal object of this advantage is to overcome these drawbacks by combining both of these controls in one device, to install it in the vent side of the engine or other device with which it is to function and to so construct it that deceleration may be accomplished at any point of the stroke regardless of the setting of the valve for metering. Thus deceleration may be set at any value and may occur at any selected point with complete closure.

Another object is to provide a self-balancing valve which will meter minute or large quantities of liquid and which will not chatter at any point in its range of operation.

Other objects and advantages will become more fully apparent as reference is had to the accompanying drawing, wherein my invention is illustrated, and in which Fig. 1 is a diagrammatic illustration of a hydraulic system controlled by my improved control means, Fig. 2 is a longitudinal section through the control means, and Fig. 3 is a view of the circumference of the valve rolled out into a plane.

More specifically, 1 refers to a fluid pump serving as a source of pressure supply for a line 2 leading into a cylinder 3 of a balanced shuttle valve 4. A piston rod 5 projects outwardly of the cylinder 3 for operation in any desired manner. If the device to be hydraulically operated is a planing machine table, for instance, the rod 5 will be subject to manual operation, while if a reciprocating hydraulic motor, it may be operated automatically as the piston reaches the end of its stroke. Since the various applications of the system are irrelevant to the present disclosure no means for operating the rod are shown and the device to be operated thereby is illustrated generally as being a piston 6 reciprocable in a cylinder 7. Two lines 8 and 9 connect into the cylinder 7 at opposite sides of the piston 6. Thus, when the valve 4 is given the position illustrated in Fig. 1, fluid under pressure flows from the line 2 into the cylinder 3 then through the line 9 into the cylinder 7, where it forces the piston 6 upwardly. The fluid on the other side of the piston 6 is forced outwardly through the line 8, into the cylinder 3 outwardly of the valve 4 and into a line 10 which leads into the control device 11, which forms the subject matter of my invention. After leaving the control device 11, the fluid passes through a line 12 to a storage tank 13 where it is again available to the pump 1 by way of a line 14. The control device 11 thus controls the operation of the piston 6 by controlling the fluid from its vent side rather than from its pressure side.

The control device 11 is best seen in Fig. 2 and is composed of a casing 15 having a bore 16 longitudinally thereof and transverse openings 17 and 18 leading into enlargements of said bore. These openings receive the lines 10 and 12 respectively. The enlargements 17 and 18 extend completely around the valve so that it is subject to equal pressures on all sides.

Slidably mounted in the bore 16 is a valve 19 of cylindrical shape having a plurality of serrations 20, 21, 22 circumferentially thereof and extending a substantial distance along the sidewalls thereof. A view of this valve, rolled out, is shown in Fig. 3 in which it is seen that the two serrations 20 are of equal length, the serrations 21 are of equal length and the same is true of the serrations 22. All might be of different length in a graduated series.

Secured to one end of the valve 19 is a valve rod 23 which extends through the casing head 24 and which has a shouldered abutment 25 held thereon by a nut 26. Journalled in the head 24 is a cylindrical bearing member 27 having its axis normal to the valve rod 23. Mounted on the member 27 for rotation therewith is a cam 28 in contact with the abutment 25 and extending from the bearing member 27 is a shaft 29 on the end of which is mounted a dial 30 manually rotatable by means of a knurled hand-grip 31.

A spring 32 concentric with the rod 23 urges the valve to opening position.

The other end of the valve 19 has an extension 33 which projects outwardly through the casing head 34 and which terminates in a hardened head 35. A cam 36 is in position to operate this head 35 through a tappet 37.

The operation is as follows: If the hand grip is rotated to fully open position the cam 28 will give minimum lift to the abutment 25 and the valve 19 will be fully open, which is to the furthest position toward the left as viewed in Fig. 2. The line 10 will, therefore, be fully open to the vent line 12. Rotation of the cam 28 will cause the valve 19 to move toward the right thus restricting the flow past the serrations according to the amount of movement imparted to the cam. This latter movement will be in opposition to the pressure of the spring 32. Regardless of the position imparted to the valve 19 by the cam 28 if the cam 36 is rotated from the position of minimum lift illustrated it will cause the valve 19 to close.

It will thus be seen that the control is both a metering device and a decelerating valve.

Although a specific embodiment of the invention has been illustrated and described, it will be understood that various changes may be made within the scope of the appended claims without departing from the spirit of the invention and such changes are contemplated.

What is claimed is:

1. A liquid metering device comprising a casing having a bore longitudinally thereof, said bore being connected at spaced points to a fluid pressure line and to an outlet line, a slide valve guarding the space between said lines, said slide valve having a plurality of serrations of varying lengths arranged circumferentially thereof and extending along the sidewall of said valve for fractional portions of its length means operative against one end of said valve for regulating the degree of constant opening thereof and means operative against the other side of said valve to completely close same irrespective of the position of the first named means.

2. A metering device comprising a casing having a bore longitudinally thereof, said bore being connected at spaced points to a fluid pressure line and to an outlet line, a slide valve guarding the space between said lines, said slide valve having a plurality of serrations of varying lengths arranged circumferentially thereof and extending along the sidewall of said valve for fractional portions of its length, a spring urging said valve to open position, manually adjustable means operative against one end of said valve for regulating the degree of opening of said serrations, a tappet connected to the other end of said valve and extending outwardly of said bore, and means operative against said tappet to close said valve irrespective of the position of said manually adjustable means.

3. A metering device comprising a casing having a bore longitudinally thereof, said bore being connected at spaced points to a fluid pressure line and to an outlet line, and a slide valve guarding the space between said lines, said valve having a rod extending therefrom through one end of said casing, a shouldered abutment on the outer end of said rod, a spring about said rod urging said valve to open position, a cam rotatable against said abutment to adjust the degree of opening of said valve, manual means for rotating said cam to a desired position, and means operable against the other end of said valve for causing the closing thereof irrespective of the position of said cam.

RACY D. BENNETT.